United States Patent [19]

Sochor

[11] 4,075,759

[45] Feb. 28, 1978

[54] TRANSVERSE CONNECTOR ASSEMBLY METHOD

[75] Inventor: Jerzy R. Sochor, Manhattan Beach, Calif.

[73] Assignee: Elco Corporation, El Segundo, Calif.

[21] Appl. No.: 706,385

[22] Filed: Jul. 19, 1976

Related U.S. Application Data

[62] Division of Ser. No. 569,100, April 17, 1975, Pat. No. 4,004,845.

[51] Int. Cl.[2] .............................................. H02G 15/00

[52] U.S. Cl. .................................. 29/629; 339/176 M; 29/630 D

[58] Field of Search ................ 339/221, 252, 256, 258, 339/276 SF; 29/629, 630 D, 628, 754; 113/119

[56] References Cited

U.S. PATENT DOCUMENTS

| | | | |
|---|---|---|---|
| 2,664,552 | 12/1953 | Ericsson et al. | 339/256 R |
| 2,785,387 | 3/1957 | Batcheller | 339/258 S |
| 3,287,686 | 11/1966 | Ruehlemann | 339/258 R |
| 3,487,356 | 12/1969 | Buck et al. | 339/242 |
| 3,601,775 | 8/1971 | Longenecker et al. | 339/258 P X |
| 3,665,375 | 5/1972 | Thoms et al. | 339/192 R |
| 3,693,139 | 9/1972 | Assmus et al. | 339/217 R |
| 3,757,277 | 9/1973 | Yamanoue et al. | 339/176 M |
| 3,827,005 | 7/1974 | Friend | 339/258 P |
| 3,865,462 | 2/1975 | Cobaugh et al. | 339/176 M |
| 3,871,736 | 3/1975 | Carter | 339/221 R |

*Primary Examiner*—Lowell A. Larson
*Attorney, Agent, or Firm*—Thomas E. Harrison, Jr.; Kenneth E. Merklen

[57] ABSTRACT

A high contact density connector system for an edge-mount semiconductor package or a like panel member having densely spaced contact means provided along an edge comprises two mating connector parts, each having a one piece insulator housing retaining a plurality of contacts having mating means arranged in a single row. The contacts are assembled into the insulator housings by parallel positioning a plurality of such housings and assembling a transversely positioned row of such contacts into corresponding positions of all housings.

7 Claims, 18 Drawing Figures

Fig. 1
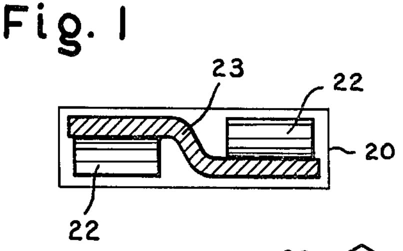
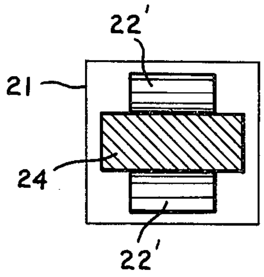
Fig. 2
PRIOR ART
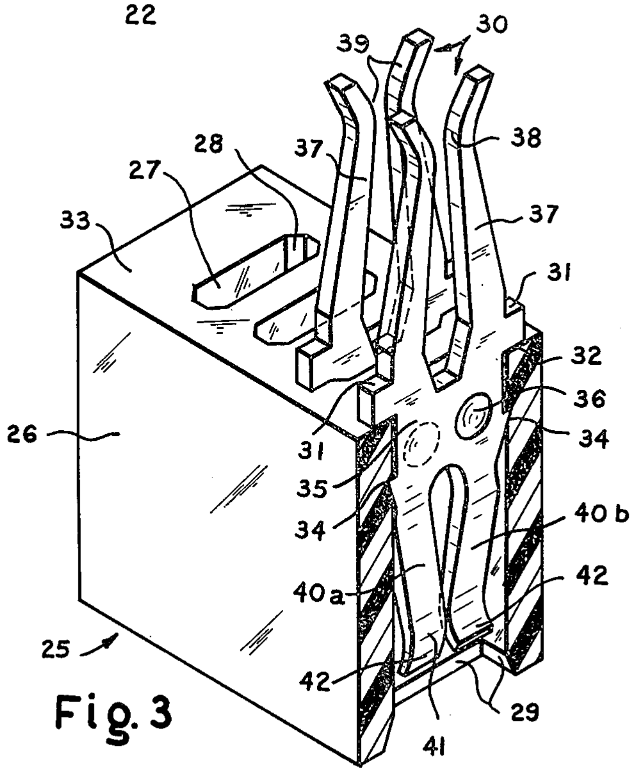
Fig. 3
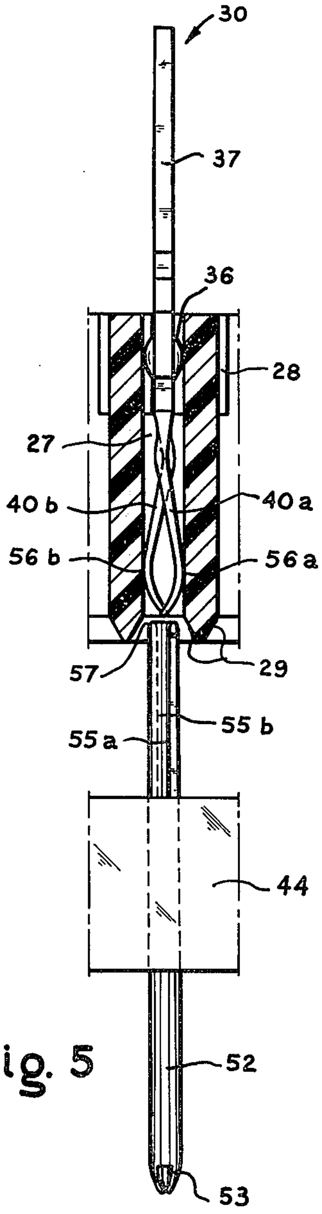
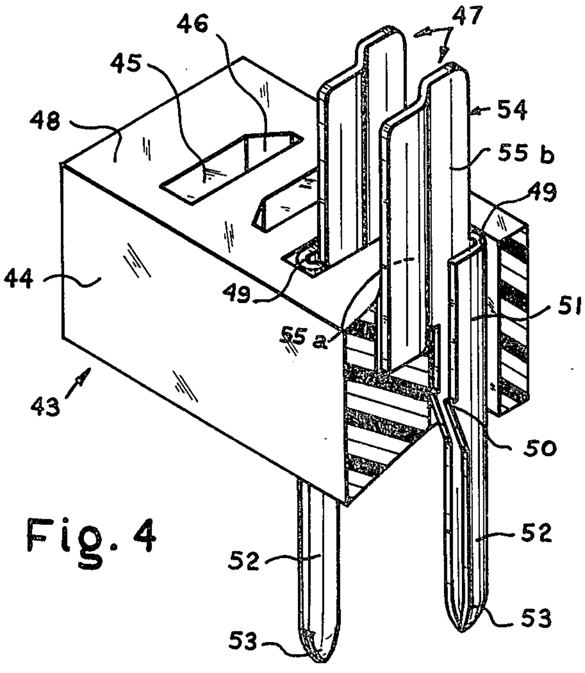
Fig. 4
Fig. 5

Fig. 6
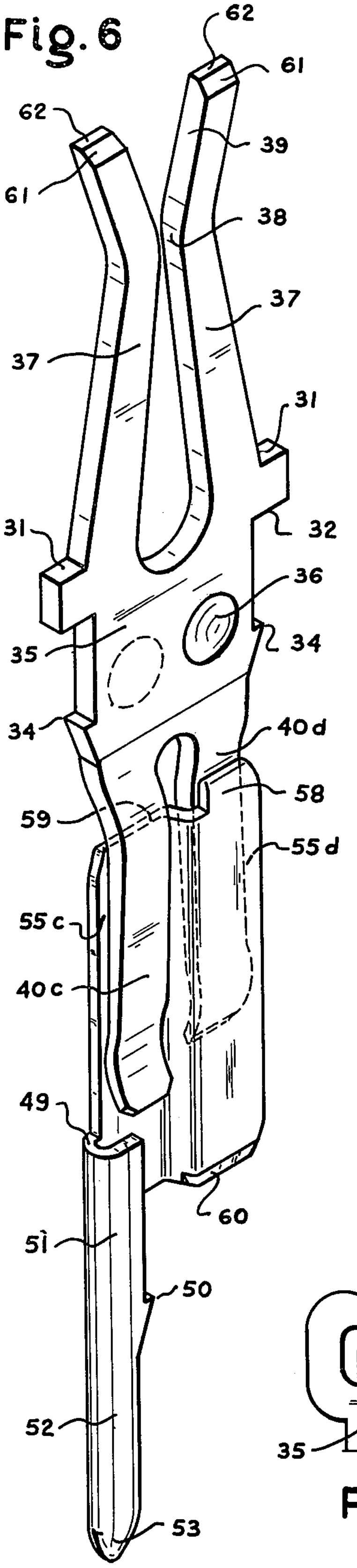
Fig. 7
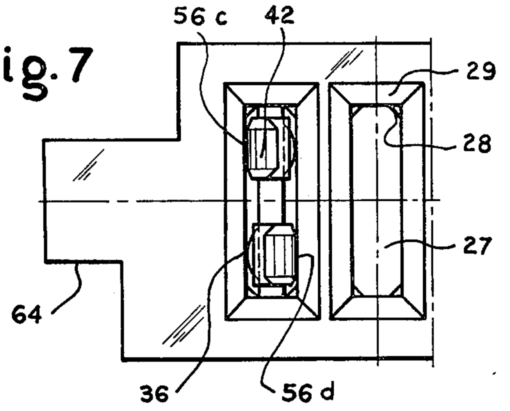
Fig. 8
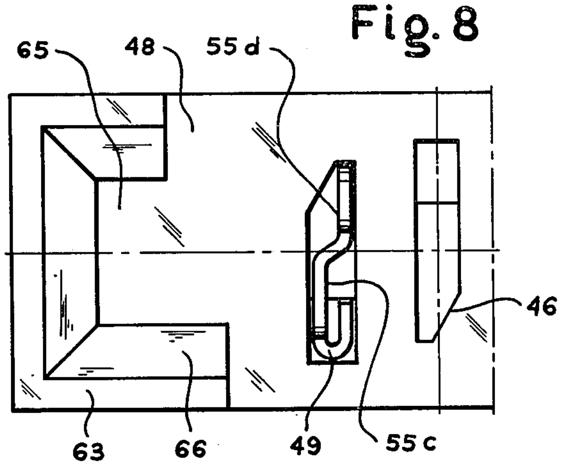
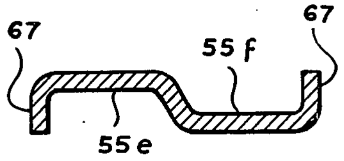
Fig. 9
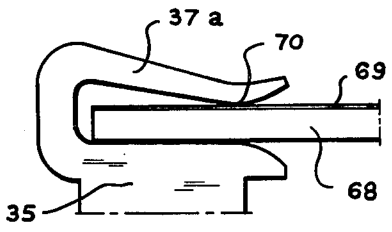
Fig. 10
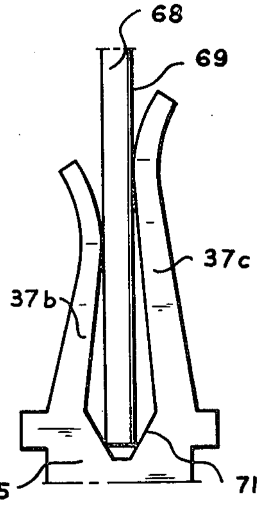
Fig. 11

Fig. 12
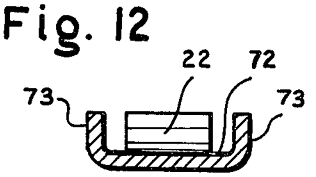
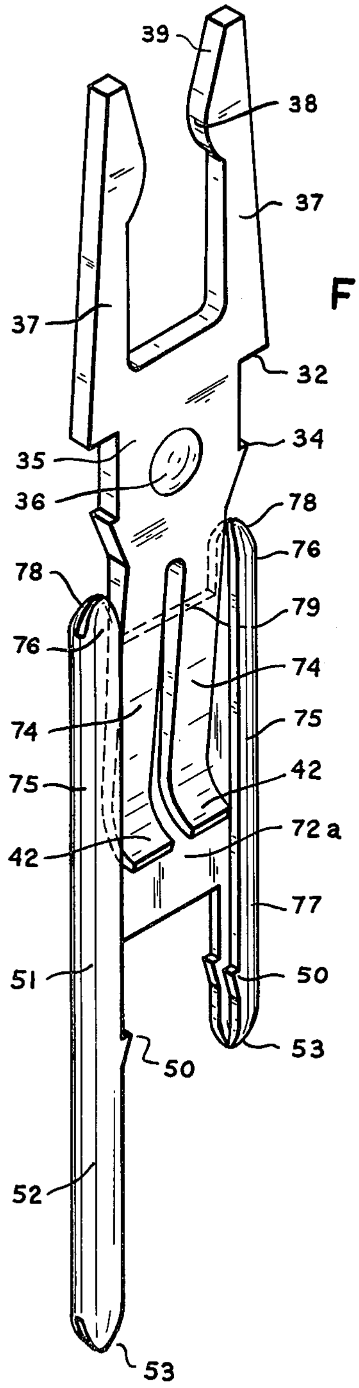
Fig. 13
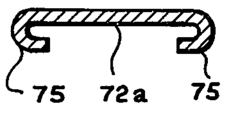
Fig. 14
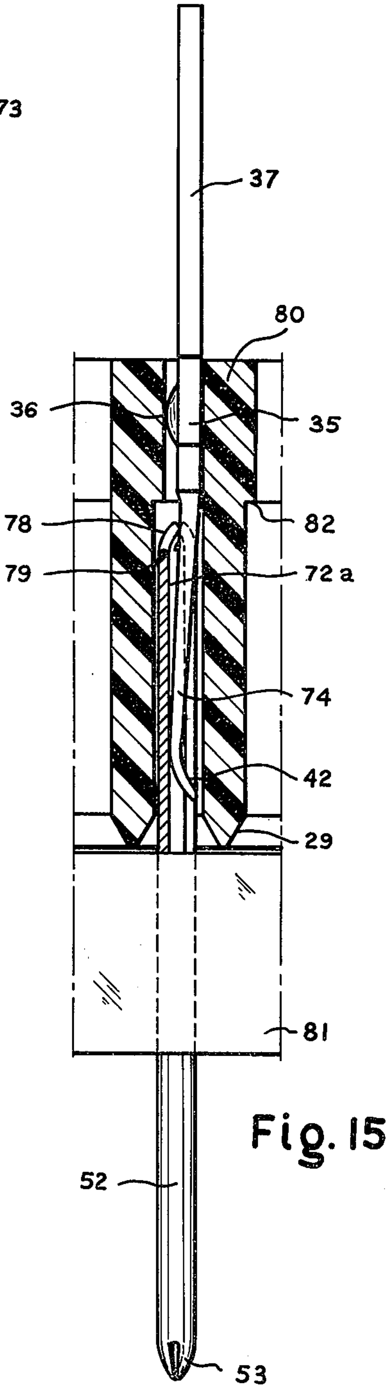
Fig. 15
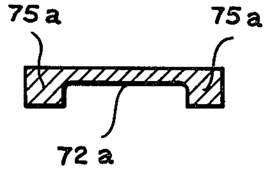
Fig. 16

TRANSVERSE CONNECTOR ASSEMBLY METHOD

REFERENCE TO RELATED APPLICATION

This is a division of patent application Ser. No. 569,100, filed 17 Apr. 1975, now U.S. Pat. No. 4,004,845, granted Jan. 25, 1977.

BACKGROUND AND BRIEF SUMMARY OF THE INVENTION

One piece connectors for substrates or circuit boards having high edge contact density, such as 0.050 inch center-to-center spacing, exist in the from of a card-edge connector, but their proliferation is impeded by reliability problems experienced by the industry.

While the performance of a 0.050 inch card edge connector is marginal, any spacing denser than 0.050 inch makes a card-edge connector impractical because of registration problems and poor contact performance.

The spacing, within a single row, of contact centers measuring 0.050 inch and less, such as 0.0375 inch is the development to which this invention specifically but not exclusively relates.

A two piece connector is desirable for such a dense spacing because it allows a permanent mounting of the circuit board in a pluggable connector through soldering or press-fit, thus shifting the disconnect interface to male and female contact mating means.

An edge-mount packaging approach, in combination with an extremely high density mounting of contacts in a connector, is one object of this invention. The present connector is best utilized in applications where size and speed of equipment are major considerations and two piece connector reliability is required.

In edge-mount packages, as contrasted to face-mount packages such as Dual In-Line packages (DIP's), larger ceramic wafers could be used very effectively, without increasing the interconnection length between any two circuits on the motherboard and allowing larger cavities for hybrid components so as to obtain more functions per package.

This invention provides a high contact density two piece connector, one piece of which, having replaceable male contacts, is permanently solder or press-fit mounted on a motherboard or a wiring panel, and the other piece, having receptacle contacts, accepts an edge-mount semiconductor package or a similar panel member and exists as a disconnect module.

Another object of the invention is to provide a simple and versatile resilent coupling contact means which can be formed with an extremely small pitch and adapted to numerous applications by providing suitable extensions to the mating means.

One such extension to the male contact is a solder or a press-fit tail. For the female or receptacle contact a cantilever tab terminal means for resiliently receiving a module package board is suitable.

The tails of successive male contacts are alternately rotated 180° in the housing to plug into an offset hole pattern in the circuit board. The mating blades are aligned in a single line for mating with the receptacle contacts, which also have mating portions in a single straight line.

The receptacle contacts could also be installed in the insulator housing alternately rotated 180°, the contacts in such case having unequal substrate receiving cantilever tabs, the shorter of the two making contact to the lower circuit pad and the longer tab reaching the higher pad with savings of space resulting from the staggering utilized to increase pad width.

Such an increase in pad width is desired because it provides improved registration and relaxed tolerancing.

A still further object of the invention is to provide high module board retention by driving the board between the two rows of metal cantilever tabs extending upwardly from the receptacle means and outwardly above the insulator housing, registering with high pressure on the package pads and permitting infra-red reflow soldering, visual inspection of registration, and on-duty contact probing.

One cantilever tab of each common pair makes electrical contact with the pad on the component side of the package substrate, the other tab providing back-up means and, if desired, serving as a jumper to the circuitry on the other side of the substrate.

The term "substrate" as used in this specification broadly encompasses ceramic substrates, circuit boards, flexible circuits or cable, or any panel member provided with electrical conductors in either wired or printed form.

BRIEF DESCRIPTION OF THE FIGURES.

FIG. 1 is a graphic illustration of the high density mating principle of the invention.

FIG. 2 is a graphic representation of a connection equivalent to the connection of FIG. 1 but constructed in accordance with the prior art.

FIG. 3 is a sectional perspective view of a female connector.

FIG. 4 is a sectional perspective view of a male connector for mating with the female connector of FIG. 3.

FIG. 5 is a fragmentary view of a longitudinally sectioned female connector of FIG. 3 with a male connector fragment of FIG. 4 shown in entering configuration.

FIG. 6 is a perspective view of female and male contacts mated together.

FIG. 7 is a bottom view of a female connector portion, similar to that of FIG. 3.

FIG. 8 is a top view of a male connector portion similar to that of FIG. 4.

FIG. 9 is an alternative cross-sectional profile of the male pin of FIGS. 4 through 6.

FIGS. 10 and 11 are fragmentary views showing alternative dispositions of the substrate edge receiving cantilever tabs.

FIG. 12 is a graphic representation of an alternative high density mating principle in accordance with the teachings of this invention.

FIG. 13 is a perspective view of a mated contact pair developed from the principle of FIG. 12.

FIG. 14 is a cross-sectional profile of the male blade of FIG. 13.

FIG. 15 is a side view of the contact couple of FIG. 13 shown with its enclosing insulation.

FIG. 16 is an alternative cross-sectional profile of a male pin.

DESCRIPTION OF THE PREFERRED EMBODIMENTS

Figure 17:
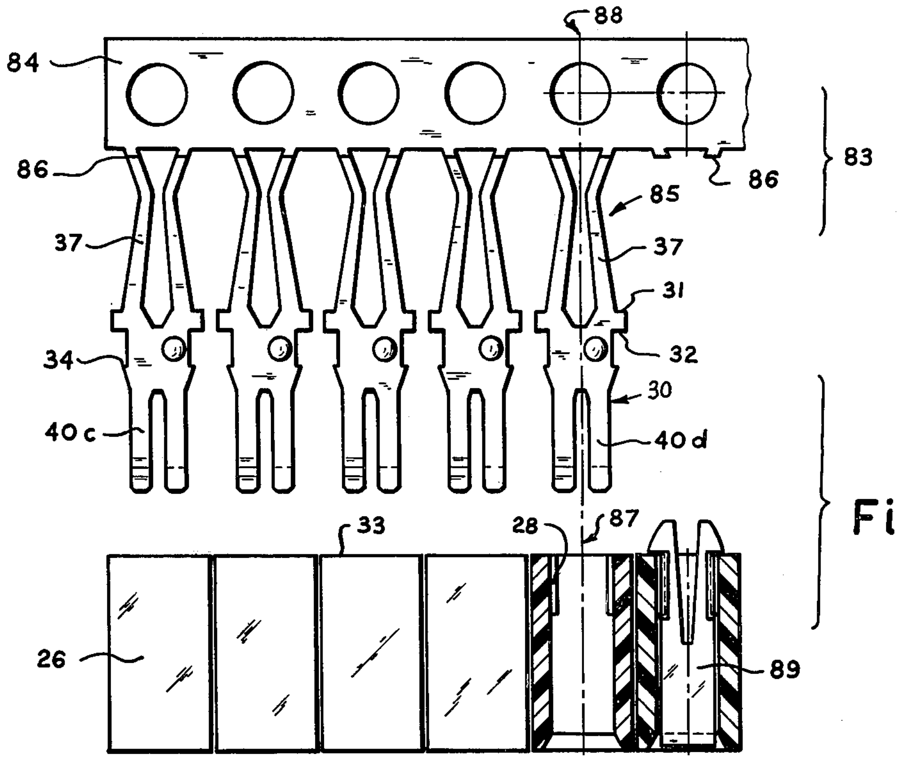
FIG. 17 illustrates an assembly procedure for a female connector.

The attainments of the present invention will become quickly apparent when FIG. 1 is taken in conjunction with FIG. 2. The two figures compare the space requirement for the mated contact means, as confined by the insulator housing walls represented by perimeter line 20 for the present invention and perimeter line 21 for a conventional contact pair. It can be seen that the vertical portions of line 20 of FIG. 1, which determine the linear contact density of the present invention, are less than one-half of the height of the corresponding portions of line 21 of FIG. 1.

Resilent contact means 22 and 22', mating with the male blade sections 23 and 24, are of the same size in both figures, signifying identical contact spring parameters in both designs. Similarily, the preformed male blade section 23 of the present invention approaches the moment of inertia and thus the rigidity of the solid pin section 24 of the conventional design. Thus the mechanical integrity of a standard spacing connector can be now duplicated in half the height or length required before this invention.

In FIG. 3 there is shown a section of a connector 25 which comprises a one piece insulator housing 26 molded from a suitable dielectric material.

Housing 26 is provided with a plurality of centrally located contact receiving apertures 27 disposed in a single line. Each aperture 27 is of a generally rectangular form throughout, with contact centering chamfers 28 extending downwardly from the top insulator side through the upper portion of the aperture, and lead-in chamfers 29 on the bottom side perimeter of said aperture to guide the male blade's lead-in means.

Contacts 30 are inserted into the housing from the top side as seen in FIG. 3 and driven into the apertures utilizing ears 31 until contact shoulders 32 of ears 31 rest on top insulator surface 33.

The preferred method of contact insertion according to the invention is the transverse method illustrated in FIG. 17 and discussed infra.

An interference fit retention is achieved between the aperture walls and barbs 34 protruding from the sides of contact shank portion 35.

Additional centering and retention may be provided by dimples 36, one on each side of shank 35 in an asymmetrical arrangement. Substrate receiving tabs 37 extend upwardly from contact shank portion 35 and above insulator top surface 33.

Above mating surfaces 38, the substrate receiving tabs diverge to form into lead-in portions 39.

The cantilever mating means **40*a* and 40*b* extend downwardly from shank portion 35, are arranged asymmetrically, and remain totally confined in the aperture 27 with mating surfaces 41** preferably contacting the insulator walls they face to provide a preload.

The free end portions 42 of the cantilever mating means below mating surfaces 41 serve as a lead-in for the mating pin and if viewed from the bottom, appear as represented by resilent contact means 22 in FIG. 1.

Each cantilever mating means **40*a* and 40*b* is thus seen to comprise a fork tine like member oriented generally in the direction of mating and has a convex mating surface, such as 41**, which faces generally normal to the direction of mating, the respective convex surfaces of each pair of fork tine members facing outwardly in opposite directions which are generally parallel.

In FIG. 4 there is shown a portion of a connector 43 which is a connector for disengageable mating with a connector of FIG. 3. The connector 43 comprises a one piece insulator housing 44 provided with a plurality of contact receiving apertures 45 alternately disposed in a line along the center of the insulator.

Each aperture 45 is generally "L" shaped when seen from the side (FIG. 18), and as a contact restricting chamfer 46, as best illustrated in FIG. 8.

Contacts 47 are inserted into housing from top side 48 and forced in place utilizing pressure against edge 49 until edge 49 is level with surface 48.

Figure 18:
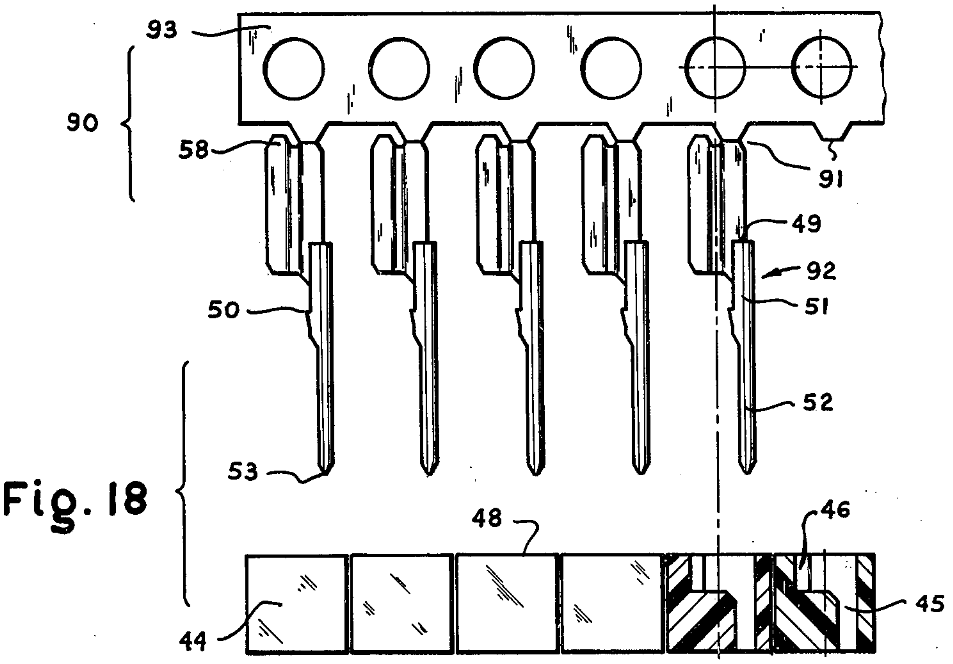
FIG. 18 illustrates an assembly procedure for a male connector.

Again, the preferred method of contact insertion according to the invention is the transverse method as illustrated in FIG. 18 and discussed infra. An interference fit retention is effected between barbs 50 and the aperture wall.

Shank portion 51 above the retention barbs 50 can be made somewhat heavier than tail section 52 projecting downwardly from the insulator bottom.

The tail 52 is of a channel or a "V" form and ends in a pointed tip 53 to provide easy registering in the circuit board holes and also as required for a solderless wrap connection. While the solder or press-fit tails 52 are alternately disposed to provide a staggered pattern, mating portions 54 remain in a single row and are uniformly oriented to comply with the pattern of resilent engaging means **40*a* and 40*b* in connector 25 of FIG. 3**.

Upon completion of engagement between connectors 25 and 43, inside flats **55*a* and 55*b* of each male blade's mating portion 54 will be in contact surfaces 41 of cantilevers 40*a* and 40*b***, thereby effecting two pressure contact areas per connection.

It is seen that blade portion 54 of each male contact protrudes from the housing in the direction of mating, is generally straight in said direction, has a step-like configuration (FIG. 1), and has two edge parts which are generally flat and parallel with each other and with the direction of mating, and an interconnecting part within which a mutual offset between the edge parts is effected.

In FIG. 5, the left side wall of the insulator 26 is removed to illustrate the relation between contact 30 and aperture 27 as viewed from the connector's left side.

The contacts are preloaded to provide desirable engagement characteristics as shown at **56*a* and 56*b***.

Also in FIG. 5, the entry cooperation between the male blade's top profile 57, lead-in chamfer 29, and the female contact's lead-in portion 42 can be observed.

The male blade's top edge 57 and the side corners are chamfered or rounded to provide an additional lead-in. As the engagement progresses from the state illustrated in the FIG. 5, the female contact cantilevers **40*a* and 40*b* are resiliently deflected away from the preload points 56*a* and 56*b* by the entering male blade and make pressure engagement with the male blade's flats 55*a* and 55*b***, respectively.

A damage proof entry of the male blade to the socket-like receiving means of a female connector can be achieved without requiring the usual closed entry protective insulation, such as represented in FIG. 2.

The damage proof entry in the present invention is enabled by the male balde's unique profile and the complementary female contact without departing from the substantially uniform rectangular character of usual female insulator aperture, thus eliminating the need for more intricate aperture constructions and the concomitant requirement for mold parting.

FIGS. 6 and 8 depict a design substantially similar to the embodiment described so far and are intended to illustrate a few more features.

It is to be understood, however, that any desired combination of the features described in all the figures herein and otherwise suggested by the scope of this invention can be used within a single embodiment.

In FIG. 6, a mated contact pair is shown without the supporting insulation.

The resilent contact cantilevers 40*c* and 40*d* are shown in pressure contact with male pin flats 55*c* and 55*d*, respectively. The total resilent deflection is the accumulation of a preload deflection from free state to preload points 56*c* and 56*d* imposed during the contact assembly in the insulator (FIG. 7), plus the deflection imposed by the male contact blade during the mating cycle. Since only a partial deflection takes place during the mating cycle to complete the connection, preloading enables the mating forces to be significantly reduced.

To further decrease the peak insertion force, the male blade's top profile, along which the engaging deflection occurs, can be stepped to provide a tab 58, and thus engage the contact springs 40*d* and 40*c* sequentially, and in this order, rather than at the same time.

The lower part 59 of the male blade's top profile is a suitable location for a break-off carrier strip.

On the lower side of the male blade, there is a chamfer 60 to facilitate the installation lead-in of the male contact into its housing. The tips of substrate receiving tabs 37 have a chamfer 61, which is a score for break-off separation of contacts from the carrier strip (not shown) at 62.

A polarizing guide means are illustrated in FIGS. 7 and 8. The polarizing guide 63 of FIG. 8 extends from insulator surface 48, at least the distance equal to the exposed length of the male pin mating portion.

The end section of a mating connector 64 is profiled to be accepted only in one way in polarizing guide opening 65. A lead-in, such as a chamfer 66, can be provided.

FIG. 9 shows an alternative cross-sectional profile of a male mating blade.

The mating flats 55*e* and 55*f* are similarily arranged as in the male contact in FIGS. 6 through 8.

A stiffening edge portion 67, added on each side of the section, constitutes the difference.

In FIG. 10 there is shown an alternative disposition of the substrate receiving means, whereby a board 68, having a circuit trace side 69, can be received horizontally to complete an electrical contact at 70 between said circuit trace and tab 37*a*. In case of a rectangular circuit board, all four edges could accept a connector with horizontally oriented substrate receiving means 37*a*.

In FIG. 11 substrate receiving tabs 37*b* and 37*c* are shown of unequal length.

If every other contact is alternately mounted in the insulator, a staggered circuit trace pattern will be possible. Chamfer 71 holds the leading edges of the substrate, thus improving its retention.

In the embodiments described heretofore, the male blade's cross-sectional profile is of a modified "Z" or "S" form, with mating flats 55*a* thru 55*f* on the opposite sides of the pin.

FIG. 12 illustrates an alternative "C" shaped pin cross-section having a single mating flat 72 shown in resilent engagement with contact means 22.

If one of stiffening forms 73 is removed, an "L" shaped cross-section results, which may be employed where further reduction in space requirement for the mated contact means is desired. Conversely, as represented in FIG. 13, mating flat 72*a* can be made wider and engage with two substantially independent resilent contact cantilevers 74 and thus provide a redundant connection.

In FIG. 13, which depicts a mated contact pair without enclosing insulation, many features are easily recognized to correspond to analogous features in the FIG. 16. Although not necessarily identical, the corresponding features are designated by the same numerals to emphasize the common scope of these embodiments.

Stiffening channels 75 on both sides of the male blade, transition into two short lead-in bosses 76 on the top side of the pin and into two tails on the bottom side of the pin.

Shorter tail 77 is intended as a stabilizing and retaining means, as is section 51 of the longer tail.

When the male contact is assembled into its housing, the shorter tail is fully enclosed.

Lead-in bosses 76 have rounded tips 78 which cooperate with the lead-in chamfers in an insulator opening during the initial phase of the engagement cycle. Bosses 76 are elevated above engaging edge 79 so that only after bosses 76 are fully entered to the mating connector opening, the actual engagement between edge 79 and resilent contact lead-ins 42 will begin.

In FIG. 14 there is shown a cross-sectional profile of a male pin of FIG. 13.

In FIG. 15, a left hand view of a mated contact pair of FIG. 13 is shown with the sustaining insulation.

Insulator 80 and the mating portion of the male pin are sectioned through the plane coincident with the insulator longitudinal symmetry plane.

The contact receiving apertures in insulators 80 and 81 are similarily disposed as those of FIGS. 3 and 4.

Step 82 is provided to increase the amount of insulation surrounding the contact shank portion 35 in order to optimize the contact retention and structural strength of insulator 80.

Step 82 can also serve as an engagement limiting stop for the male pin and as a positive seating means for a keying plug.

In FIG. 16 there is shown an alternative construction of a male pin cross-sectional profile.

Stiffening means 75*a* are solid as opposed to the channel-like stiffening means 75 in FIG. 14.

The section of FIG. 16 can be achieved by forming a pre-profiled metallic strip in a stamping die.

The final two FIGS. 17 and 18 relate to the aforementioned transverse connector assembly procedures according to the invention.

In FIG. 17 there is shown a contact strip 83 comprising carrier portion 84 and individual contacts 85 separably attached to the carrier strip at break-off scored portions 86.

Immediately below contact strip 83 an end side view of a grouping of insulator housings 26 is shown, into which contacts 85 are to be assembled.

The longitudinal center plane 87 of each insulator housing 26 is oriented transversely to contact strip 83 and coincides with the respective contact centerlines, such as 88.

Furthermore, each individual contact 85 is vertically lined-up with a respective aperture in the insulator into which it is being assembled.

A large number of contacts, e.g., 50 or 100, can be assembled in corresponding apertures of an equal number of insulators simultaneously with the aid of carrier strip 84, which can be then broken away using suitable fixturing.

If desired, a contact 85 can be omitted in a specified aperture and a keying plug 89 resiliently installed in place of the contact to allow mating only with the mating connector which has a male blade contact omitted in a corresponding contact position.

If a mismatch is attempted, the male pin corresponding to the key location will be blocked from entering, thus preventing engagement. The contact assembly procedure heretofore described is applicable to contact strip 90 and insulators 44 of FIG. 18.

Break-off edge 91 is scored to facilitate separation of a contact 92 from carrier strip 93.

The transverse method of contact assembly illustrated in FIGS. 17 and 18 is very advantageous since it can be used to assemble the extremely compact connectors of the invention economically, rapidly, and reliably. Also it is versatile since the same contact strip 84 can be used to load insulator strips with different contact spacings. This is because the spacing between contact centers on strip 84 is independent of the spacing between contact centers when loaded into insulator housings 26.

Also if contacts are to be omitted at one or several positions on an insulator housing (e.g. to accommodate a keying pin such as 89 of FIG. 17 aforementioned) such omission can be achieved readily in all housings without modifying strip 84; all that need be done is not to load a contact strip at the position which the contacts are to be omitted.

A further advantage of this method is that the contact features, such as ears 31 and edges 49, which are employed to install the contacts into insulators, also serve as press-on means for press-fit assembly of connectors in circuit board holes.

While I have illustrated and described this invention with respect to several embodiments, they can not be exhaustive merely because of the multitude of connector applications for which the transverse strip assembly process is suitable. The true scope of the invention is therefore indicated only by the appended claims and their legal equivalents.

I claim as new:

1. A method for assembling contacts into elongated insulator housings to form connectors, comprising:

providing a plurality of insulator housings having a line of contact-receiving apertures along the length of each housing, positioning said plurality of elongated insulator housing in side-by-side, parallel relationship so that corresponding apertures of said respective housing are aligned in rows intersecting the line of apertures of each housing, providing an integral elongated strip of contacts including an integral carrier portion, with the spacings between said contacts along said carrier strip corresponding to the spacings between respective apertures of said rows of corresponding apertures, aligning said contacts with the apertures of one of said rows of corresponding apertures, inserting said contacts of said strip substantially simultaneously into said one row of corresponding apertures, and severing said elongated carrier strip from said contacts.

2. The method of claim 1 wherein said severing of said elongated carrier strip is performed after the insertion of said contacts into said respective apertures.

3. The method of claim 1 wherein said integral carrier strip is integrally joined to said contacts by respective break-off portions so as to permit said carrier strip to be readily severed from said contacts.

4. The method of claim 1 wherein said rows of corresponding apertures are orthogonal to said lines of apertures of said respective housings.

5. The method of claim 1 wherein said contacts each have a mating portion, a body portion, and a tail portion, said mating portions being joined to said integral carrier strip.

6. The method of claim 5 wherein said mating portions comprise a pair of tine-like members designed to engage the edge of a printed circuit card.

7. The method of claim 5 wherein said mating portions comprise a male blade designed to mate with a female receptacle contact.

* * * * *